United States Patent
Stark et al.

(10) Patent No.: US 8,738,589 B2
(45) Date of Patent: May 27, 2014

(54) CLASSLOADING TECHNIQUE FOR AN APPLICATION SERVER THAT PROVIDES DEPENDENCY ENFORCEMENT

(75) Inventors: Scott M. Stark, North Bend, WA (US); Adrian Brock, Neuchatel (CH); Ales Justin, Vrhnika (SI)

(73) Assignee: Red Hat, Inc., Raleigh, NC (US)

( * ) Notice: Subject to any disclaimer, the term of this patent is extended or adjusted under 35 U.S.C. 154(b) by 1034 days.

(21) Appl. No.: 12/571,044

(22) Filed: Sep. 30, 2009

(65) Prior Publication Data
US 2011/0078672 A1 Mar. 31, 2011

(51) Int. Cl.
*G06F 17/30* (2006.01)
*G06F 9/445* (2006.01)

(52) U.S. Cl.
USPC .......................... 707/695; 717/166

(58) Field of Classification Search
USPC .......................... 717/166; 707/695
See application file for complete search history.

(56) References Cited

U.S. PATENT DOCUMENTS

| | | | |
|---|---|---|---|
| 5,329,626 A | 7/1994 | Klein et al. | |
| 7,069,554 B1 * | 6/2006 | Stammers et al. | 717/178 |
| 7,316,010 B1 * | 1/2008 | Daynes et al. | 717/140 |
| 7,886,286 B2 * | 2/2011 | Rapicault et al. | 717/166 |
| 2002/0129177 A1 * | 9/2002 | McGuire et al. | 709/315 |
| 2003/0200350 A1 * | 10/2003 | Kumar et al. | 709/315 |
| 2005/0144226 A1 | 6/2005 | Purewal | |
| 2006/0041862 A1 | 2/2006 | Moussallam et al. | |
| 2006/0085482 A1 | 4/2006 | Trowbridge | |
| 2007/0003347 A1 | 1/2007 | Manfredi et al. | |
| 2007/0006203 A1 * | 1/2007 | Marwinski | 717/166 |
| 2007/0061792 A1 * | 3/2007 | Atsatt | 717/151 |
| 2007/0240154 A1 | 10/2007 | Gerzymisch et al. | |
| 2007/0266392 A1 | 11/2007 | Thoelke | |
| 2008/0060083 A1 * | 3/2008 | Koved et al. | 726/27 |
| 2009/0217306 A1 * | 8/2009 | Wusthoff et al. | 719/327 |

OTHER PUBLICATIONS

IBM, "Rational Application Developer: Differences between EJB 3.1 and EJB 2.1" http://publib.boulder.ibm.cominfocenter/radhelp/v8/index.jsp?topic=%Fcom.ibm.javaee.doc%2Ftopics%Fcejb3vejb21.html.
USPTO; Office Action for U.S. Appl. No. 12/571,030; mailed Mar. 28, 2013.

\* cited by examiner

*Primary Examiner* — Jorge A Casanova
(74) *Attorney, Agent, or Firm* — Lowenstein Sandler LLP

(57) ABSTRACT

A Java-based application server, which supports multiple component models, includes a classloading module to enforce dependencies among classes and among the components that uses the classes. The classloading module determines whether a classloader created at deployment can share a version of a class with other classloaders. The classloading module also uses dependency information to determine which of the other classloaders on which the classloader depends. The classloading module uses pluggable classloading policies to determine the rules to be followed during classloading operations. The same state machine is used for classloading and for controlling the lifecycle of multiple component modules. The classloading module also utilizes abstraction of interfaces to communicate requirements and capabilities among the classloaders and with the system.

20 Claims, 7 Drawing Sheets

DEPLOYMENT STAGES

DEPLOYMENT STAGES

CLASSLOADING TECHNIQUE FOR AN APPLICATION SERVER THAT PROVIDES DEPENDENCY ENFORCEMENT

TECHNICAL FIELD

Embodiments of the present invention relate to computer programming, and more specifically, to installation of the implementation of a Java-based application server.

BACKGROUND

An application server is a software framework that delivers applications to client computers or devices. An application server facilitates software development by allowing designers and programmers to devote their time to meeting software requirements rather than dealing with the standard low-level details of providing a working system. An application server can be provided as middleware that sits between operating systems and high-level enterprise applications. An application server enables applications to intercommunicate with dependent applications, such as web servers, database management systems, and chart programs.

The Java language and enterprise programming standards (e.g., Java Enterprise Edition (Java EE)) have been widely adopted by enterprises to build and deploy applications. However, the success of Java has also given rise to a variety of alternative programming and deployment approaches. Currently, enterprises use a number of applications platforms (e.g., lightweight servlet containers, OSGi, Java EE and other application platforms) along with a myriad of programming approaches, APIs and dynamic languages to support their business applications. Each application platform is generally designed for and hard-coded with a specific programming model. This application environment is inflexible and cannot be easily adapted to the constantly changing Java development. Further, each individual business application often requires different operational capabilities for scalability, manageability, high availability and security. The varied requirements have resulted in a highly complex application environment that is costly and difficult to manage.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
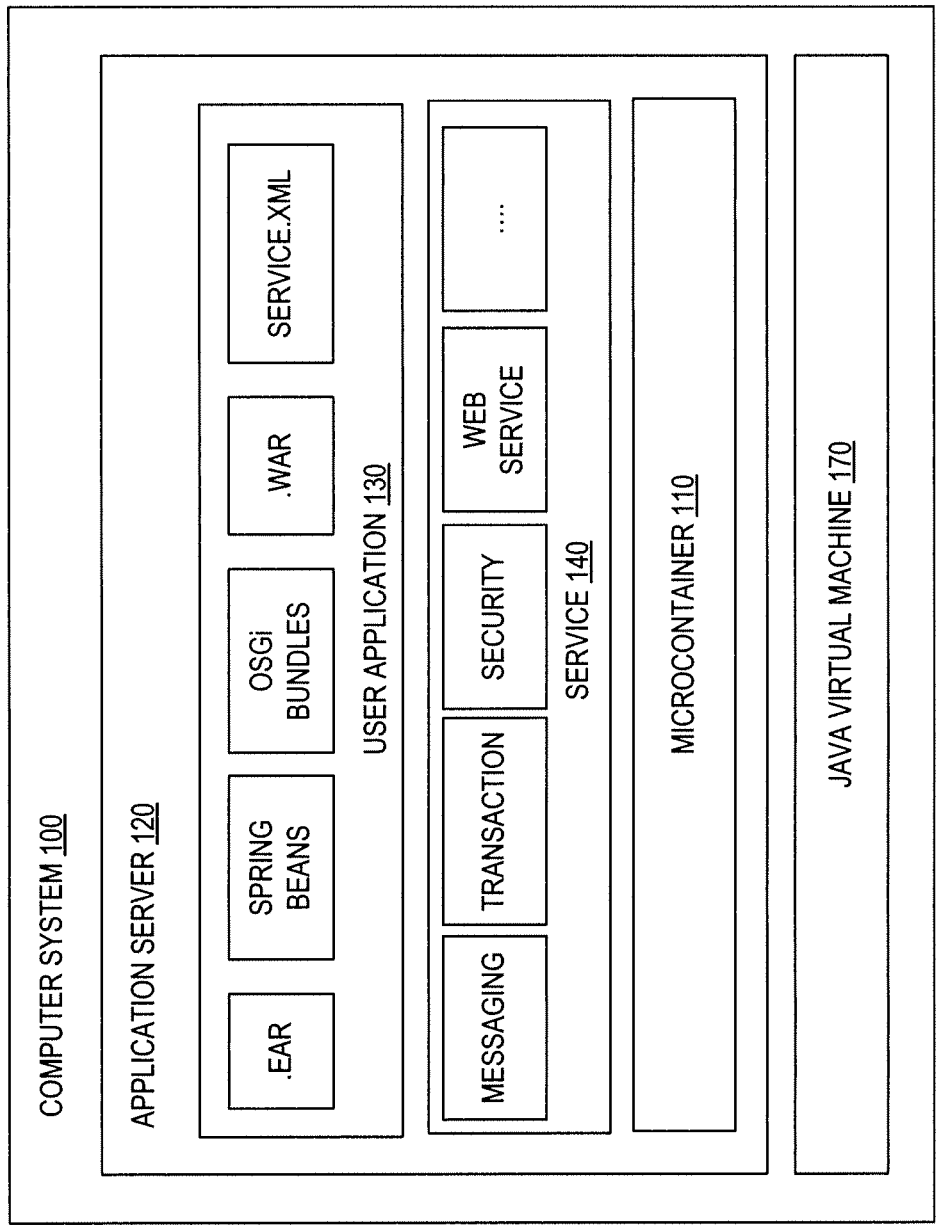
FIG. 1 is a block diagram illustrating one embodiment of an application server that supports multiple component models.

Described herein is a method and system of a Java-based application server that includes a classloading module to enforce dependencies among classes and among the components that uses the classes. The classloading module determines whether a classloader created at a deployment stage of an application server can share a version of a class with other classloaders. The classloading module also uses dependency information to determine which of the other classloaders on which the classloader depends. The classloading module uses pluggable classloading policies to determine the rules to be followed during classloading operations. The same state machine is used for classloading and for controlling the life-cycle of multiple component modules. The classloading module also utilizes abstraction of interfaces to communicate requirements and capabilities among the classloaders and with the system.

According to one embodiment of the present invention, components of different component models cross-reference each other during the deployment stages. The deployment stages include a classloader stage where a new classloader can be created. The new classloader is associated with an application that provides a service.

According to one embodiment of the present invention, components of different component models cross-reference each other during the deployment stages. The deployment stages include a classloader stage where a new classloader can be created. The new classloader is associated with an application that provides a service.

According to one embodiment of the present invention, the term "component" refers to a reusable software program. The term "component model" refers to a software framework, which includes a set of rules for defining the components and the interactions among the components. For example, the component models include, but are not limited to, Plain Old Java Object (POJO), Spring, Guice, OSGi, JavaBeans, Java Management Extensions (JMX) Managed Beans (MBeans), Enterprise Java Bean version 3 (EJB3), etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "using", "communicating", "loading", "controlling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram that illustrates an embodiment of a computer system 100 that hosts an application server 120. The computer system 100 may include a server machine or a cluster of server machines. The application server 120 can be accessed by one or more of remote clients over a network (not shown), such as a private network (e.g., a local area network (LAN), wide area network (WAN), intranet, etc.) or a public network (e.g., the Internet). The application server 120 runs user applications 130 to provide enterprise services 140, such as Web service, messaging, security, transaction, etc. The user applications 130 can be implemented with a wide range of component models, including, but not limited to, POJO, Spring, Guice, OSGi, JavaBeans, Java Management Extensions (JMX) Managed Beans (MBeans), Enterprise Java Bean version 3 (EJB3), etc. The user applications 130 can include .ear files, .war files, .xml files, Spring Beans, OSGi bundles, etc. The application server 120 can be stored in data storage (not shown) coupled to the server machine or machines. The data storage may include memory, caches, data drives, internal or external storages, etc.

The term "component model" refers to a collection of components and the interactions among these components. Components are reusable software programs that can be developed and assembled easily to create sophisticated applications. For example, JMX MBeans is a component model and MBeans are the components. With JMX MBeans, interactions among the MBeans include executing MBean operations, referencing attributes, setting attributes and declaring explicit dependencies between named MBeans. Interactions among the components of other component models can be similarly described.

According to one embodiment of the present invention, the application server 120 includes a microcontainer (MC) 110 to support the user applications 130 and the services 140 that are constructed by a wide range of component models. The MC 110 processes the components from these component models through a sequence of deployment stages to generate fully installed components that run on a Java Virtual Machine (JVM) 170. The components can be plug-in components. At runtime, the MC 110 integrates the components and applies dependencies and aspects across the components. Thus, the MC 110 serves as an integration spine for the various components of various component models. In operation, the MC 110 executes operations, references and setting attributes, and declares dependencies between components. It is understood that the operation principle of the MC 110, as will be described in greater detail below, is compatible with any component models that are currently in use or will be developed in the future.

The MC 110 is a lightweight container. The term "container" refers to a software construct (e.g., class) that holds or organizes software objects (e.g., Java objects). A container also includes methods for adding and removing objects, as well as methods for iterating the addition and removal of the objects. Although shown as part of application server 120, the MC 110 can be used as a standalone container outside of application server 120 and can reside on the same or a different machine from the machine that hosts the application server 120. The MC 110 can be plugged into any server environment.

In one embodiment, the MC 100 is also an Inversion-of-Control (IoC) container. The term "IoC," also known as Dependency Injection (DI), is a programming model for maintaining dependencies among components. According to the IoC principle, a first component declares its dependencies on other components. A controller in the MC 110 determines when the first component reaches a given state that needs certain objects from the other components. The object can be a provider of certain capabilities or resources needed by the first component. If the first component has reached the given state, the MC 110 supplies (or "injects") the necessary objects to the first component from the other components. Injecting an object from a second component into a first component defines a dependency between the first and second components. A first component can also explicitly declare that it demands an object to be supplied by a second component. Some embodiments of operations of the MC 110 will be described in greater detail with references to FIGS. 2-6.

Figure 2:
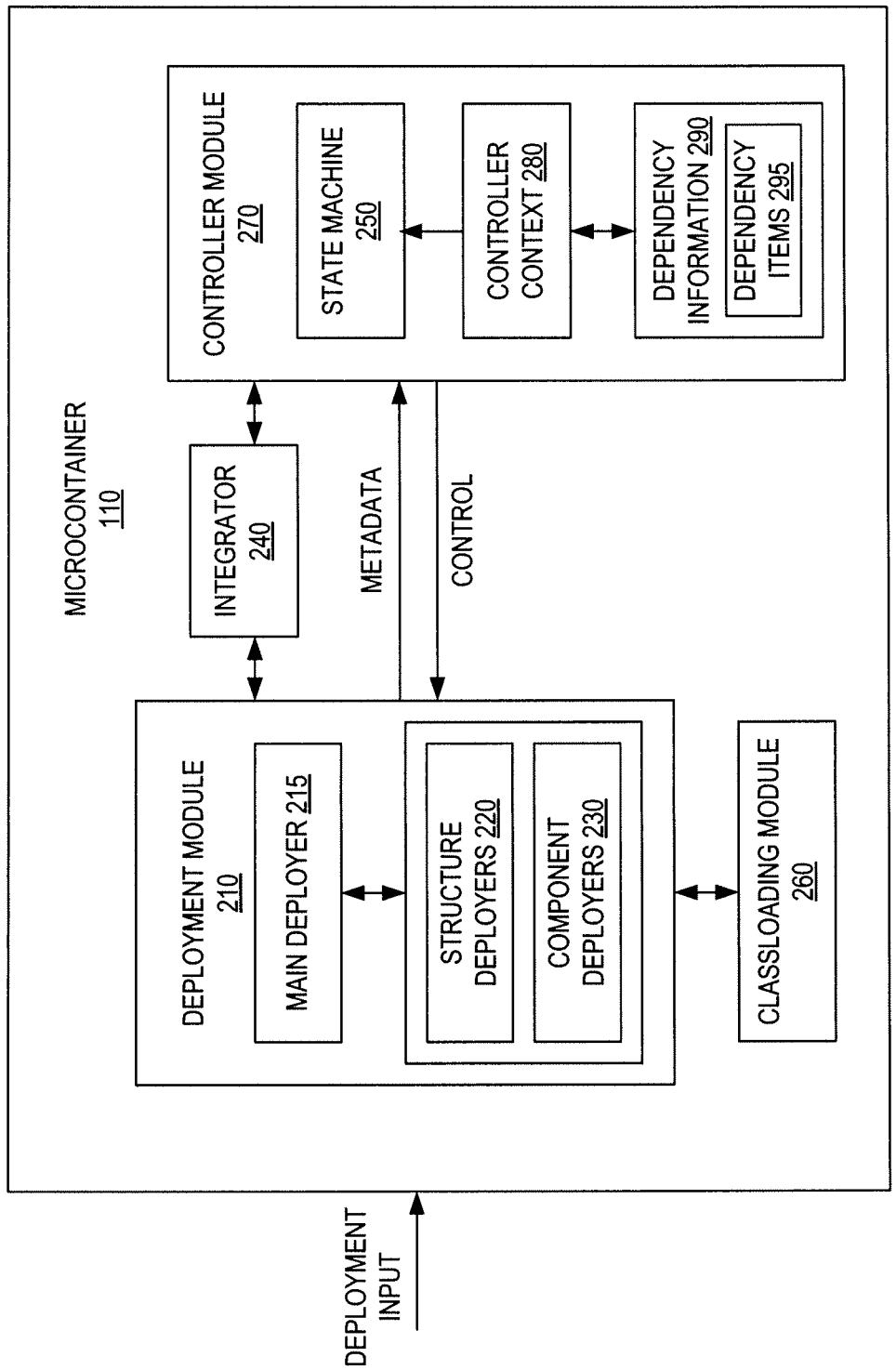
FIG. 2 is a block diagram illustrating one embodiment of a microcontainer that runs on the application server of FIG. 1.

FIG. 2 illustrates an embodiment of the MC 110 and the deployment module 210. Deployment module 210 is highly extensible. That is, a new deployer can be easily integrated into the deployment module 210. Deployment module 210 includes a main deployer 215, structure deployers 220 and component deployers 230. The operations of the structure deployers 220 and the component deployers 230 follow a pre-determined sequencing order. The sequencing order can be determined by deployment stages and input/output of metadata generated by the deployers. Each deployment stage can be implemented by one or more deployers. Some deployers can be shared by different components, and some deployers are component-specific. The deployers form a processing pipeline, which transforms an input to output metadata that can be used to create a runtime component. Embodiments of deployment stages will be described in more detail with reference to FIG. 3.

In one embodiment, the main deployer 210 serves as the deployment entry point. Requests to deploy a component are sent to the main deployer 210, and the main deployer 210 determines which of the structure deployers 220 and the component deployers 230 can handle the deployment of a component. This determination can be based on the type of the deployment input, e.g., an EJB3, a Java Archive (JAR), etc. The term "deployment" refers to the services offered by a component in the application server 120. In one embodiment, the structure deployers 220 analyze the structure of a deployment to generate metadata, which describes the structure of the deployment, including metadata locations, classpaths, sub-deployments order, modification type, etc. For example, the metadata may indicate that certain POJOs should be run together or wired in a particular way, or one POJO should be given to another POJO at a certain time. The metadata may come from the deployment input and/or the analysis result from the structure deployer 220. The metadata are passed into the MC 110 for further runtime operations.

After the structure deployers 220 perform analysis of a deployment, the component deployers 230 further process the previously-generated metadata to form a runtime component.

The deployment module 210 interacts with a classloading module 260 to locate and load classes (e.g., Java classes) into the MC 110. The loaded classes may be used by the components of different component models at runtime. The classloading module 260 includes a number of class loaders, some of which can be defined by a user of the MC 110. Each classloader may be associated with a different user application. A classloader locates, defines, and validates classes, assigns security permissions to a loaded class, and controls the visibility of one class from another class. A classloader controls the version of a class visible to a component. The classloading module 260 provides proper class or classes, a compatible version, etc. The classloading module 260 is invoked during a classloader stage of the deployment stages. The classloading module 260 operates according to policies for resolving class locations and mechanisms for resolving dependencies. The policies and mechanisms are pluggable and can be defined by a user.

Class loaders may be dependent on each other. A class loader may reference classes from another class loader. For example, a first class loader can specify a dependency on a second class loader from which the first class loader wants to load classes. The first class loader can then references the classes from the second class loader. By explicitly specifying the dependency information, a dependent class loader (e.g., the first class loader) can be automatically redeployed when the second class loader changes. Embodiments of operations of the classloading module 260 will be described in more detail with reference to FIG. 6.

The MC 110 also includes a controller module 270, which includes a state machine 250 to control the state transitions of a deployment. The state machine 250 also controls the life cycle of a runtime component, which includes instantiate, configure, create, start, stop and destroy. More specifically, services have a lifecycle that includes an install phase and uninstalled phase. The installed phase includes: instantiate, configure, create, start, install, and the uninstall phase includes stop, destroy, un-configure (nullify properties), nullify target in controller context. New states (e.g., new deployment stages) can be added when necessary. The state machine 250 is a pluggable state machine that can be extended with plug-ins. The controller module 270 manages dependencies among components of various component models based on the metadata generated by the deployment module 210. In one embodiment, the controller module 270 also includes a controller context 280 to supply state information to the state machine 250, and dependency information 290. The dependency information 290 may include a number of dependency items 295. Embodiments of the controller context 280 and the dependency items 295 will be described in more detailed with reference to FIG. 4.

The controller module 270 can be operated in an auto mode, an asynch mode, a manual mode, or an on-demand mode. By default the controller module 270 uses the auto mode, which means that the controller module 270 pushes a component as far as it can go into the deployment stages with respect to dependencies. The asynch mode is similar to the auto mode, except that asynch mode is installed in a parallel thread. A component in on-demand mode will not be used or installed until after some other components that explicitly depend on it are deployed. In the manual mode, a user can push a component forwards and backwards along the chain of deployment stages and the state ladder.

In one embodiment, the MC 110 also includes an integrator 240 to integrate a component of one component model (the source) into another component model (the target). In one embodiment, the target component model is a base POJO component model. For example, a Spring component and a Guice component can be integrated with a POJO to form a Spring-POJO component and a Guice-POJO component, respectively. The integrated component can refer to the libraries of the source component model, and its state transitions can be handled as a component of the target component model. The integration allows components of different component models to use each other. For example, an integrated Guice-POJO component can be injected into a JavaBeans component. An example of the operations performed by the integrator 240 will be described in more detail with reference to FIG. 5.

The controller module 270 manages the dependencies among components of the same or different component models based on the metadata passed from the deployers. For example, the metadata may indicate that a component "A" in a deployment is dependent on an aspect during runtime. An aspect implements a common feature (sometimes referred to as a cross-cutting concern) shared by many components. An aspect may be implemented as a plain Java class that encapsulates aspect code and provides a pointcut definition, which defines when to execute the aspect code. An aspect is applied when a pointcut in a component is encountered (e.g., when the pointcut definition matches pre-defined events or points within the component). When aspect code changes, the controller module 270 identifies the components affected by the change and determines the actions for affected components while maintaining dependencies among the components. Further, if an aspect is changed, the controller module 270 also determines whether to restart a service associated with the affected components, or whether to re-inject the resources into the affected components.

As another example, the metadata may indicate that a component "A" in a first state is dependent on a component "B" in a second state. The "state" herein refers to a deployment stage, a lifecycle state, or other state of a component. Based on the metadata, the controller module 270 can keep component "A" in the first state until component "B" completes its second state and passes the necessary dependency information to component "A". Once the necessary dependency information is received from component "B", the controller module 270 allows component "A" to continue with its succeeding states. The dependencies can be cyclic dependencies. Continuing with the above example, component "B" in a third state can be further dependent on component "A" in the third state. After component "B" completes the second state and passes the dependency information to component "A", component "B" enters the third state and stays there until component "A" completes its third state and passes the necessary dependency information to component "B". Once the necessary dependency information is received from component "A", the controller module 270 allows component "B" to continue with its succeeding state.

Figure 3:
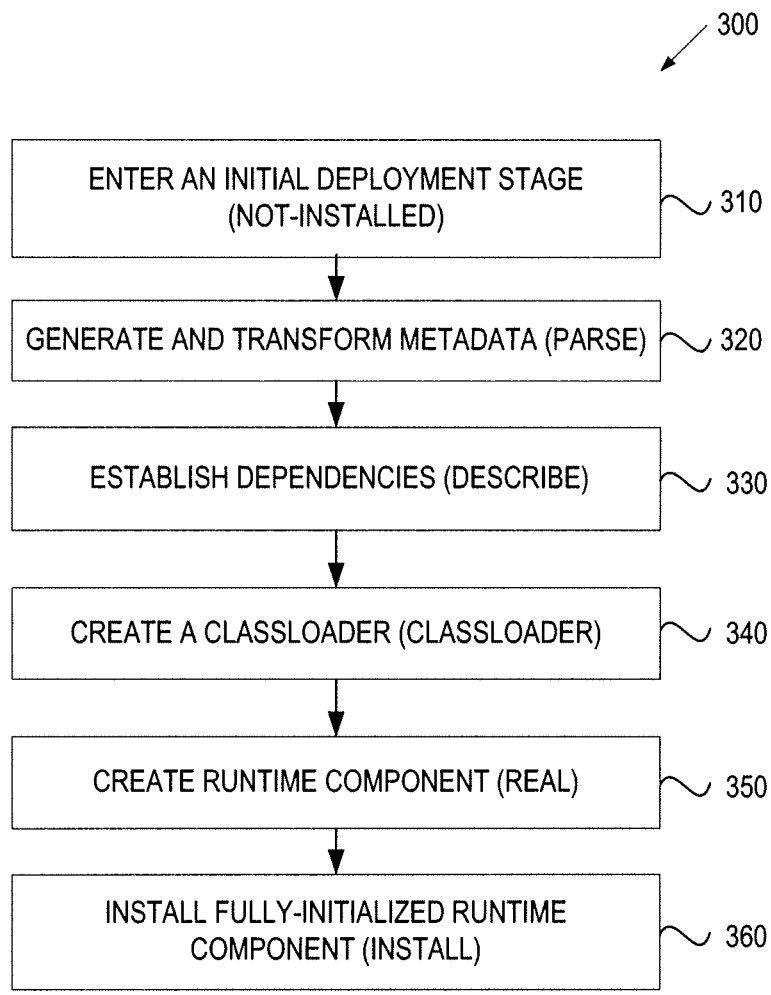
FIG. 3 is a flow diagram illustrating a chain of deployment stages, in accordance with one embodiment of the present invention.

FIG. 3 illustrates an embodiment of a chain of deployment stages 300 implemented by the deployment module 210. In this embodiment, 6 major deployment stages are shown. It is understood that each deployment stage may include one or more sub-stages for performing additional operations on a deployment. The deployment stages 300 include: not_installed (block 310), where a component input enters an initial deployment stage; parse (block 320), where metadata is generated (e.g., from xml descriptors, etc) and transformed into a format readable by the controller module 270 (e.g., a POJO); describe (block 330), where dependencies among components are established; classloader (block 340), where classloaders are created and classloader-dependent processing occurs (e.g., aspects and annotation processing); real (block 350), where runtime components are created; and installed (block 360), where fully initialized runtime components are generated.

Figure 4:
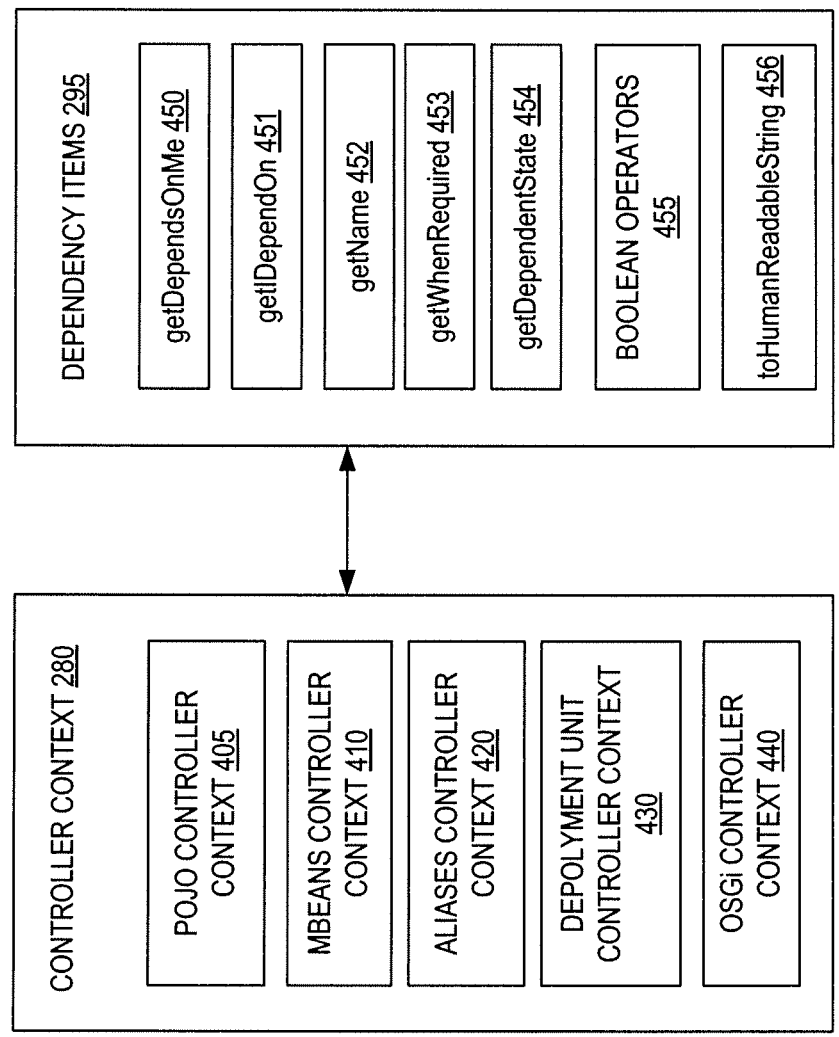
FIG. 4 is a block diagram illustrating an embodiment of a controller context and dependency items that run on the microcontainer of FIG. 2.

FIG. 4 illustrates an embodiment of the controller context 280 and the dependency items 295 in the dependency information 290 of FIG. 2. In one embodiment, the controller context 280 includes a plurality of component-model-specific controller contexts; e.g., POJO controller context 405, MBeans controller context 410, Aliases controller context 420, deployment unit controller context 430 and OSGi controller context 440. POJO controller context 405 is the main implementation of the controller context, which handles POJO components. MBeans controller context 410 handles MBeans components and OSGi controller context 440 handles OSGi components. The Aliases controller context 420 handles Alias components. Deployment unit controller context 430 handles the task of deployment as an individual runtime component model that contains a plurality of basic work units (referred to as "Deployment Units").

Different component models map to different states or stages. For example, the deployment unit controller context 430 maps a Deployment Unit to deployment stage(s), which are then transformed into ControllerState(s). The ControllerStates defines the state transitions performed by the state machine 250, and is what the MC state machine 250 understands. The controller contexts 405, 410, 420 and 440 directly map POJOs, Mbeans, Aliases and OSGi components, respectively, to their respective ControllerState(s) to direct the operation of the state machine 250. POJOs, Mbeans, Aliases, OSGi and Deployment Units are all components inside same MC state machine instance. Therefore, these components can easily interact with each other, regardless to which state representation they are mapped. For a component model that does not have a corresponding controller context (e.g., Spring or Guice), its component can be integrated with one of the component models that have corresponding controller contexts (e.g., POJOs, Mbeans, Aliases and OSGi). The component models that have corresponding controller contexts (e.g., POJOs, Mbeans, Aliases and OSGi) are referred to as target component models. The operation of the integration will be described in greater detail with reference to FIG. 5.

A deployment in the MC 110 can provide one or more services that are implemented by components of multiple component models. Assume that DeploymentA comprises POJO1 and Mbean1, and DeploymentB comprises POJO2 and Mbean2. The components POJO1, Mbean1, POJO2, Mbean2 and DeploymentA and DeploymentB can cross-depend on one another. For example, POJO2 can be defined to depend on DeploymentA.

The controller module 270 (FIG. 2) can detect, from the metadata, the component model to which a component belongs, and invoke the associated controller context 280. The controller context 280 is metadata-driven, and can be easily extended and reused for any additional component models without the need to rewrite the code.

In one embodiment, the controller context 280 obtains the current state of a deployment for the controller module 270 and the required states of other components for the deployment to proceed. The dependency information 290 obtains and supplies dependency information to the controller context 280, and determines whether a dependency is resolved. The dependency items 295 may include a getDependsOnMe 450 operator to obtain the name of the component that depends on the current deployment, a getIDependOn operator 451 to obtain the name of the component on which the current deployment depends, a getName operator 452 to obtain the name of the current deployment, a getWhenRequired operator 453 to obtain when the dependency is required for the current deployment, a getDependentState 454 to obtain the state of the dependency, and a number of Boolean operators 455 to determine whether the dependency is resolved. The dependency items 295 may further include a toHumanReadableString 456 to return a human readable string for a system administrator to track the resolution of the dependency.

Figure 5:
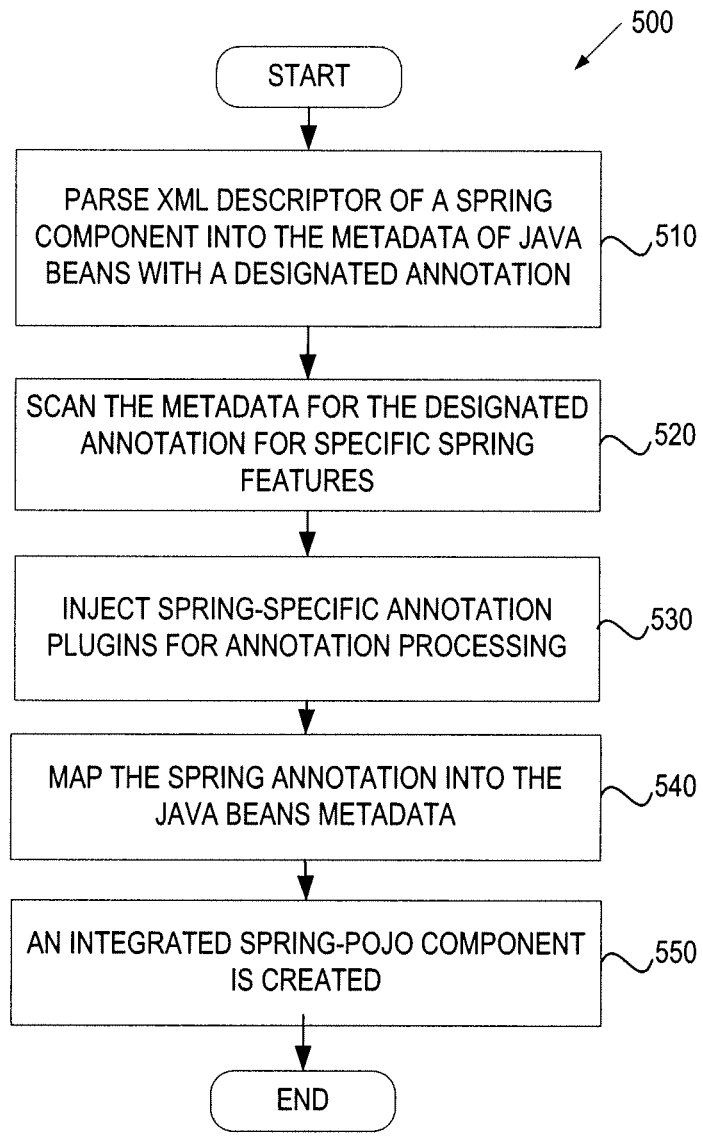
FIG. 5 is a flow diagram illustrating a method for integrating components of different component models, in accordance with one embodiment of the present invention.

FIG. 5 is a flow diagram illustrating an example of a method 500 for integrating components of different component models. The method 500 may be performed by processing logic 726 of FIG. 7 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the integrator 240 of FIG. 2 to integrate a Spring component into another POJO component model.

Referring to FIG. 5, in one embodiment, the method 500 begins when the integrator 240 parses the descriptors (e.g., XML descriptors) of a Spring component into the metadata of a POJO component model (block 510). The metadata includes a designated Spring annotation (e.g., @SpringBean) to distinguish it from other beans. The integrator 240 then scans the metadata for the designated Spring annotation for specific Spring features (block 520). When a designated Spring annotation is found, the integrator 240 injects Spring-specific annotation plugins (e.g., BeanNameAware) for further processing of the annotation (block 530). The designated Spring annotation can be mapped into POJO metadata (block 540). As a result, an integrated Spring-POJO component can be created as a runtime component (block 550).

It is understood that the above operations can be applied to the integration of other component models with minor modifications. For example, a Guice component can be configured and integrated with the base POJO component model by implementing a module and a plugin. A configured Guice component can be injected into an appropriate deployer in the deployment module 210 to create an integrated Guice-POJO component.

Figure 6:
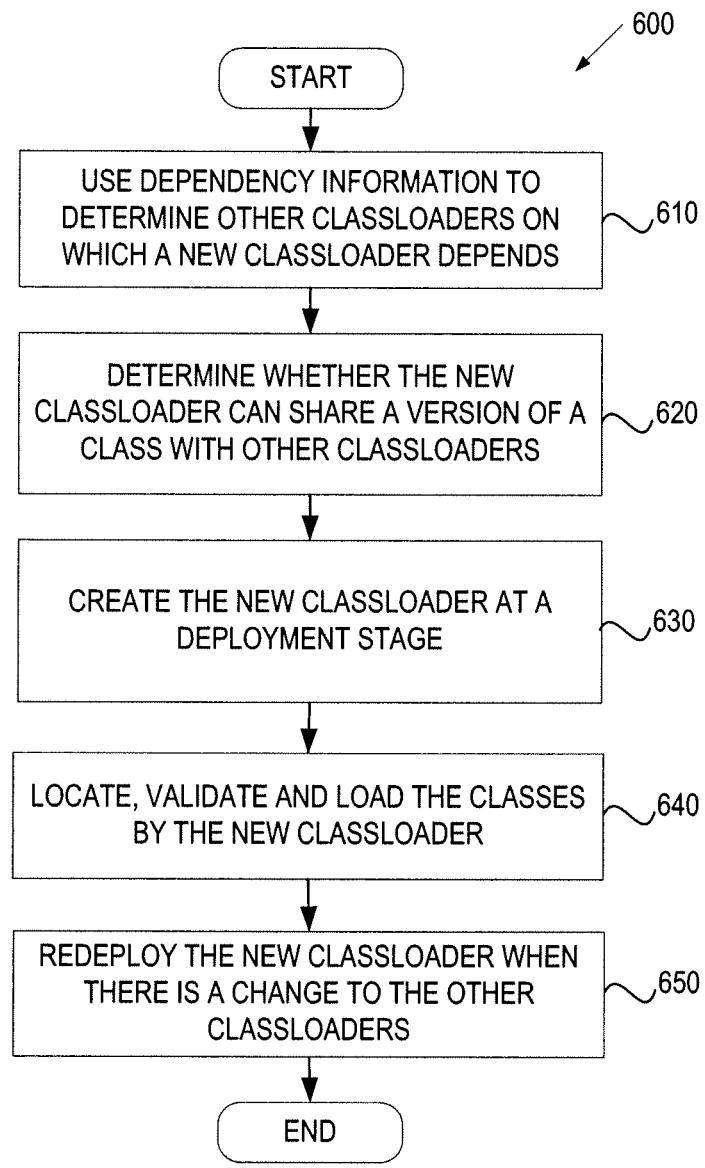
FIG. 6 is a flow diagram illustrating a method for performing classloading operations, in accordance with one embodiment of the present invention.

FIG. 6 is a flow diagram illustrating an example of a method 600 for classloading operations. The method 600 may be performed by processing logic 726 of FIG. 7 that may comprise hardware (e.g., circuitry, dedicated logic, programmable logic, microcode, etc.), software (e.g., instructions run on a processing device to perform hardware simulation), or a combination thereof. In one embodiment, the method 600 is performed by the classloading module 260 of FIG. 2.

Referring to FIG. 6, in one embodiment, the method 500 begins when the deployment stages reach the classloader stage (block 340 of FIG. 3). At the classloader stage, the classloading module 260 uses the dependency metadata generated by the deployers in one or more prior deployment stages (e.g., the describe stage) to identify the other classloaders from which a new classloader depends (block 610). In one embodiment, class namespace isolation is implemented by allowing each application to have its own classloader and its own version of classes. Thus, the same class may have different versions that are loaded by different classloaders. The different versions of the same class can co-exist at the same time. The classloading module 260 determines whether the new classloader can share a version of a class with another classloader (block 620). As mentioned above in connection with FIGS. 2-5, the classes shared by the classloaders can be used by components belonging to different component models. A classloader (e.g., a first classloader) can explicitly specify its dependency on another classloader (e.g., a second classloader). With the explicit dependency information, the first classloader can reference classes from the second classloader.

Continuing with the classloading operation, the classloading module 260 is invoked to create a new classloader (block 630). The new classloader then locates, validates, and loads all of the classes necessary for a deployment (block 640). During runtime operations, if a change is made to any of the other classloaders from which the new classloader depends (e.g., an upgrade is made to a class), the classloading module 260 automatically redeploys the new classloader to refer to the upgraded class (block 650). This runtime "hot" redeployment maximizes the uptime of an application server, without necessarily bringing it down and re-starting it to reload the changed class.

The classloaders described herein use pluggable policies to define the rules for classloading operations. Changes to the classloading module 260 can be made to the classloading policies without altering the general classloading implementation details. For example, classloading policies may include whether to check a classloader's parent first, which classloaders are the delegates of the current classloader, what classes to expose or to import, what filters to set up, whether to cache an object and where to cache, etc. These policies can be easily updated and extended as necessary. Further, the same state machine 250 of FIG. 2 is also used during classloading to define and resolve classloading dependencies. The use of the same state machine 250 for component modules and classloading greatly simplifies the control of classloading behavior and lifecycle for any component model.

Additionally, the classloaders described herein utilizes the abstraction of "Requirement" and "Capability." "Requirement" and "Capability" are two interfaces used by the classloading module 260. "Requirement" refers to a dependency that needs to be satisfied for a classloader to be valid. "Capability" refers to an object or data provided by a classloader to satisfy a Requirement. "Requirement" and "Capability" are completely agnostic of any details; that is, they can be unaware of what the actual implementation of the two interfaces is, or what implementation resolves a requirement.

The classloaders described herein utilizes package and module to implement the "Requirement" and "Capability." A system developer can choose which packages to use from a library, or to simply use the entire library (that is, a module). Thus, the use of a module is simpler than the use of packages. This abstraction can easily be extended to work with any future classloading model, including the modules in the Java Specification Requests 294 (JSR294) system.

Figure 7:
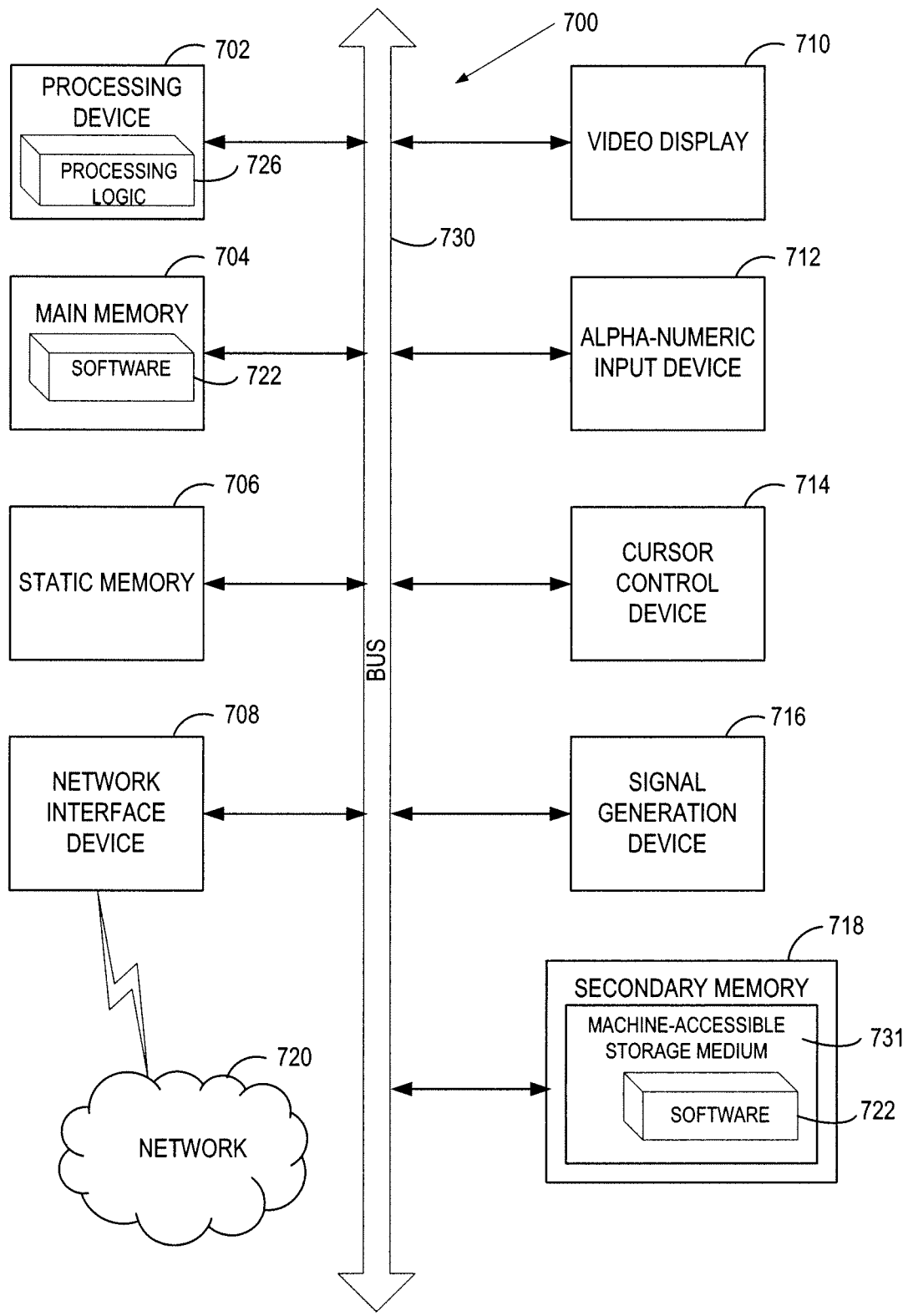
FIG. 7 illustrates a diagrammatic representation of a machine in the exemplary form of a computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein (e.g., the application server 120, the MC 110 and its internal modules). The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may store the application server 120, the MC 110 and its internal modules (FIGS. 1 and 2). While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a processing device, whether a classloader is associated with a pluggable policy;
   in view of the pluggable policy, using a state machine to resolve dependencies and to load classes into a container of an application server for use at runtime, wherein the state machine controls operation of the classloader and lifecycle of components deployed on the application server; and
   communicating, by the processing device, requirement and capability of the classloader via abstraction of interfaces.

2. The method of claim 1, further comprising:
   specifying, by a first classloader, a dependency on a second classloader;
   referencing a class from the second classloader; and
   in response to a change to the second classloader, automatically redeploying the first classloader.

3. The method of claim 1, further comprising:
   determining the dependencies of the components of different component models, each component being a reusable software program and each component model comprising a different set of rules defining its respective components.

4. The method of claim 1, wherein loading the classes further comprises:
   loading the classes with a plurality of classloaders, each classloader associated with a different application.

5. The method of claim 1, wherein loading the classes further comprises:
   loading multiple versions of a same class by the classloader; and
   controlling, by the classloader, a version of the multiple versions to be visible to a component to be installed.

6. The method of claim 1, wherein loading the classes further comprises:
   loading the classes with a user-defined classloader that operates according to user-defined policies.

7. The method of claim 1, further comprising:
   creating the classloader subsequent to generation of dependency information that describes dependencies among classloaders.

8. The method of claim 1, wherein loading the classes further comprises:
   loading different versions of a same class by different classloaders, with each classloader associated with a different application; and
   running the application server with the different versions co-existing on the application server.

9. A non-transitory computer readable storage medium having instructions stored thereon that, when executed by a processing device cause the processing device to perform operations comprising:
   determining, by the processing device, whether a classloader is associated with a pluggable policy;
   based on the pluggable policy, using a state machine to resolve dependencies and to load classes into a container of an application server for use at runtime, wherein the state machine controls operation of the classloader and lifecycle of components deployed on the application server; and
   communicating, by the processing device, requirement and capability of the classloader via abstraction of interfaces.

10. The non-transitory computer readable storage medium of claim 9, the operations further comprising:
    specifying, by a first classloader, a dependency on a second classloader;
    referencing one or more classes from the second classloader; and
    in response to a change to the second classloader, automatically redeploying the first classloader.

11. The non-transitory computer readable storage medium of claim 9, the operations further comprising:
    determining the dependencies of the components of different component models, each component being a reusable software program and each component model comprising a different set of rules defining its respective components.

12. The non-transitory computer readable storage medium of claim 9, wherein loading the classes comprises:
    loading the classes with a plurality of classloaders, each classloader associated with a different application.

13. The non-transitory computer readable storage medium of claim 9, wherein loading the classes comprises:

loading multiple versions of a same class by the classloader; and controlling, by the classloader, a version out of the multiple versions to be visible to a component to be installed.

14. The non-transitory computer readable storage medium of claim 9, wherein loading the classes comprises:

loading the classes with at least one user-defined classloader that operates according to user-defined policies.

15. The non-transitory computer readable storage medium of claim 9, further comprising:

creating the classloader subsequent to generation of dependency information that describes dependencies among classloaders.

16. The non-transitory computer readable storage medium of claim 9, wherein loading the classes comprises:

loading different versions of a same class by different classloaders, with each classloader associated with a different application; and running the application server with the different versions co-existing on the application server.

17. A system comprising:

data storage to store an application server; and a processing device coupled to the data storage to:

determine whether a classloader is associated with a pluggable policy;

based on the pluggable policy, use a state machine to resolve dependencies and to load classes into a container of an application server for use at runtime, wherein the state machine controls operation of the classloader and lifecycle of components deployed on the application server; and communicate requirement and capability of the classloader via abstraction of interfaces.

18. The system of claim 17, wherein the processing device further:

specifies, by a first classloader, a dependency on a second classloader;

references a class from the second classloader; and in response to a change to the second classloader, automatically redeploys the first classloader.

19. The system of claim 17, wherein the processing device uses dependency information to determine dependencies of the components of different component models, each component being a reusable software program and each component model comprising a different set of rules defining its respective components.

20. The system of claim 17, wherein the classes are loaded by a plurality of classloaders, each classloader associated with a different application.

* * * * *